US008971878B2

(12) United States Patent
Munje (10) Patent No.: US 8,971,878 B2
(45) Date of Patent: *Mar. 3, 2015

(54) ARCHITECTURE OPTIMIZED FOR APPLICATION DATA SHARING WITHIN A MOBILE COMMUNICATIONS DEVICE

(71) Applicant: BlackBerry Limited, Waterloo (CA)

(72) Inventor: Arun Munje, Ottawa (CA)

(73) Assignee: BlackBerry Limited, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/262,842

(22) Filed: Apr. 28, 2014

(65) Prior Publication Data

US 2014/0228015 A1 Aug. 14, 2014

Related U.S. Application Data

(63) Continuation of application No. 13/018,197, filed on Jan. 31, 2011, now Pat. No. 8,731,546, which is a continuation of application No. 11/114,560, filed on Apr. 25, 2005, now Pat. No. 7,894,809.

(51) Int. Cl.
*H04W 4/00* (2009.01)
*G06F 17/30* (2006.01)
(Continued)

(52) U.S. Cl.
CPC ......... *H04W 4/003* (2013.01); *G06F 17/30575* (2013.01); *H04W 4/00* (2013.01);
(Continued)

(58) Field of Classification Search
CPC ....... H04W 4/00; H04W 8/18; H04M 3/4931; H04M 1/274508; H04M 1/275; G06F 17/30646; G06F 17/30864
USPC ........ 455/556.1, 550.1, 556.2, 557, 558, 433, 455/186.1, 466, 414.1, 416, 461; 370/342, 370/335, 320, 329, 310; 707/999.2, 707/999.204, 458, 769, 759; 375/152, 130, 375/326; 1/1; 379/219; 709/217, 206, 203
See application file for complete search history.

(56) References Cited

U.S. PATENT DOCUMENTS 5,910,981 A * 6/1999 Bhagat et al. ................. 379/219
7,082,428 B1 * 7/2006 Denny et al. .......................... 1/1
(Continued)

FOREIGN PATENT DOCUMENTS

EP 11143667 A2 6/2001
EP 1484703 A1 3/2004
(Continued)

OTHER PUBLICATIONS

A Space-Efficient Flash Translation Layer for Compact Flash Systems, IEEE Transactions on Consumer Electronics, vol. 48#2, May 2002.
(Continued)

*Primary Examiner* — Mahendra Patel
(74) *Attorney, Agent, or Firm* — The Danamraj Law Group, P.C.

(57) ABSTRACT

The present disclosure discloses a mobile communication device comprising a local common address database object accessible to at least one application; a communication subsystem for communicating with a network; and a database querying logic module. The database querying logic module, in conjunction with the at least one application, is operable to receive a query relating to an address record; determine that no record in a local common database disposed on the mobile communications device meets the conditions of the received query; query, via the network, a remote database for at least one remote matching record meeting the conditions of the received query; receive, via the network, the at least one remote matching record; and update the local common address database object to incorporate the at least one remote matching record.

16 Claims, 6 Drawing Sheets

(51) Int. Cl.
*H04M 1/725* (2006.01)
*H04W 8/22* (2009.01)
*H04M 1/2745* (2006.01)
*H04M 1/275* (2006.01)
*H04M 1/57* (2006.01)
*H04M 3/493* (2006.01)
*H04W 8/18* (2009.01)

(52) U.S. Cl.
CPC ............ *H04M1/72522* (2013.01); *H04W 8/22* (2013.01); *G06F 17/30646* (2013.01); *G06F 17/30864* (2013.01); *H04M 1/274508* (2013.01); *H04M 1/275* (2013.01); *H04M 1/575* (2013.01); *H04M 3/4931* (2013.01); *H04W 8/18* (2013.01); *Y10S 707/99933* (2013.01)
USPC ........ 455/433; 455/414.1; 455/461; 707/769; 707/758; 310/310; 707/999.003

(56) References Cited

U.S. PATENT DOCUMENTS

| | | | |
|---|---|---|---|
| 7,085,257 B1* | 8/2006 | Karves et al. | 370/352 |
| 7,225,260 B2 | 5/2007 | Herrod | |
| 7,464,070 B2* | 12/2008 | Yagawa | 1/1 |
| 2001/0034244 A1* | 10/2001 | Calder et al. | 455/556 |
| 2002/0194260 A1 | 12/2002 | Headley et al. | |
| 2003/0017824 A1 | 1/2003 | Uhlmann | |
| 2003/0032410 A1 | 2/2003 | Saraswat | |
| 2003/0236842 A1* | 12/2003 | Natarajan et al. | 709/206 |
| 2004/0077363 A1 | 4/2004 | Lazaro et al. | |
| 2004/0249797 A1 | 12/2004 | Jarvinen et al. | |
| 2005/0021551 A1* | 1/2005 | Silva et al. | 707/102 |
| 2005/0091272 A1* | 4/2005 | Smith et al. | 707/104.1 |
| 2005/0169213 A1* | 8/2005 | Scian et al. | 370/329 |
| 2007/0038720 A1 | 2/2007 | Reding et al. | |
| 2007/0061334 A1 | 3/2007 | Ramer et al. | |

FOREIGN PATENT DOCUMENTS

| | | |
|---|---|---|
| GB | 2378348 A | 2/2003 |
| WO | 0227489 A2 | 4/2002 |

OTHER PUBLICATIONS

CIPO, Notice of Allowance, Application No. 2,544,714, May 29, 2013, 1 pg.
CIPO, Office Action, Application No. 2,544,714, Jul. 19, 2012, 3 pgs.
CIPO, Office Action, Application No. 2544714, Jul. 26, 2010, 2 pgs.
CIPO, Office Action, Application No. 2544714, Oct. 21, 2008, 2 pgs.
EPO, Communication Examination Report, Application No. 05252566.4, Feb. 11, 2010, 4 pgs.
EPO, Communication Examination Report, Application No. 05252566.4, Nov. 27, 2008, 5 pgs.
EPO, Communication Examination Report, Application No. 05252566.4, Jun. 19, 2006, 4 pgs.
EPO, Search Report, Application No. 05252566.4, Sep. 16, 2005, 2 pgs.
USPTO, Notice of Allowance, U.S. Appl. No. 11/114,560, Oct. 19, 2010.
USPTO, Office Action, U.S. Appl. No. 11/114,560, May 14, 2010, 11 pgs.
USPTO, Office Action, U.S. Appl. No. 11/114,560, Nov. 10, 2009.
USPTO, Office Action, U.S. Appl. No. 11/114,560, Apr. 1, 2009, 10 pgs.
USPTO, Office Action, U.S. Appl. No. 11/114,560, Sep. 17, 2008, 8 pgs.
USPTO, Office Action, U.S. Appl. No. 11/114,560, Mar. 24, 2008, 13 pgs.
USPTO, Office Action, U.S. Appl. No. 11/114,560, Sep. 21, 2007, 15 pgs.

* cited by examiner

ARCHITECTURE OPTIMIZED FOR APPLICATION DATA SHARING WITHIN A MOBILE COMMUNICATIONS DEVICE

CROSS REFERENCE TO RELATED APPLICATION

This non-provisional application is a continuation application of co-pending U.S. patent application Ser. No. 13/018,197, filed Jan. 31, 2011, entitled "ARCHITECTURE OPTIMIZED FOR APPLICATION DATA SHARING WITHIN A MOBILE COMMUNICATIONS DEVICE", which is itself a continuation of U.S. patent application Ser. No. 11/114,560, filed Apr. 25, 2005, now U.S. Pat. No. 7,894,809, the entire contents of both of which are incorporated herein by reference.

FIELD OF THE APPLICATION

The present patent disclosure generally relates to wireless data service networks. More particularly, and not by way of any limitation, the present patent disclosure is directed to a scheme for maintaining and sharing data, and in particular address data, between various applications and components within a mobile communications device disposed in a wireless data service network.

BACKGROUND AND SUMMARY

Within a wireless data service network, information is shared between a fixed server and at least one mobile communications device. Within certain networks, the mobile communications device may host two or more applications requiring access to the same body of data, at least a portion of which is stored on the fixed server.

The present disclosure relates to a method for sharing address data among multiple applications on a mobile communications device comprising receiving, at the mobile communication device, a query from a query source; determining that no record in a local common database disposed on the mobile communications device meets the conditions of the received query, the local common database being accessible to at least one application disposed on the mobile communications device; querying, via a network, a remote address database disposed on a remote server, for at least one remote matching record meeting conditions of the received query; receiving via the network the at least one remote matching record; and updating the local common database to incorporate the at least one remote matching record.

Another embodiment of the present disclosure relates to a mobile communication device comprising a local common address database object accessible to at least one application; a communication subsystem for communicating with a network; and a database querying logic module. The database querying logic module, in conjunction with the at least one application, is operable to receive a query relating to an address record; determine that no record in a local common database disposed on the mobile communications device meets the conditions of the received query; query, via the network, a remote database for at least one remote matching record meeting the conditions of the received query; receive, via the network, the at least one remote matching record; and update the local common address database object to incorporate the at least one remote matching record.

Yet another embodiment of the present disclosure may relate to a mobile communications device incorporating a first data storage space, or database, and at least two querying means. At least one querying means is operable to query the first data storage space as to the existence of a data record matching the query within the first data storage space. At least one additional querying means is operable to query a second data storage space outside of the mobile communications device as to the existence of a data record matching the query within the second data storage space if the data record is not found within the first data storage space. The query of the second data storage space is conducted over a wireless data service network. In one embodiment, the two querying means may be integrated into a single logic structure operable in the software environment of the mobile communications device.

The mobile communications device incorporates a structure for copying a queried data record from the second data storage space to the first data storage space whenever the queried data record is located within the second data storage space but not located within the first data storage space. Additionally, the mobile communications device incorporates a structure for communicating the contents of the first data storage space to at least two applications resident on the mobile communications device, which may include a contacts application and an email application, as examples.

The wireless data service network may include a General Packet Radio Service (GPRS) network, an Enhanced Data Rates for Global System for Mobile Communications (GSM) Evolution (EDGE) network, a 3rd Generation (3G) network, an Integrated Digital Enhanced Network (IDEN), a Code Division Multiple Access (CDMA) network, a Time Division Multiple Access (TDMA) network or a combination of the above. The second set of data may be disposed in a server operably connected to the internet. In certain embodiments, the data in the first data storage space and the second data storage space comprise address data. Depending on the specific application, the querying operations may be conducted by a portion of the operating system, by a separate application or by a portion of a virtual operating system operating on the mobile communications device.

The present disclosure discloses a method for sharing data among multiple applications within a mobile communications device incorporating a number of steps relating to the searching and movement of data among multiple data storage spaces. The steps of the method disclosed include querying a first data storage space regarding the existence of a queried data record within the first data storage space and querying a second data storage space disposed outside of the mobile communications device through a wireless data service network whenever the first data storage space does not contain the queried data record. Where the queried data record is located within the second data storage space but not located within the first data storage space, a queried data record is copied from the second data storage space to the first data storage space. At least a portion of the queried data record may be communicated to one or more applications within the mobile communications device via a common database.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale.

Figure 1:
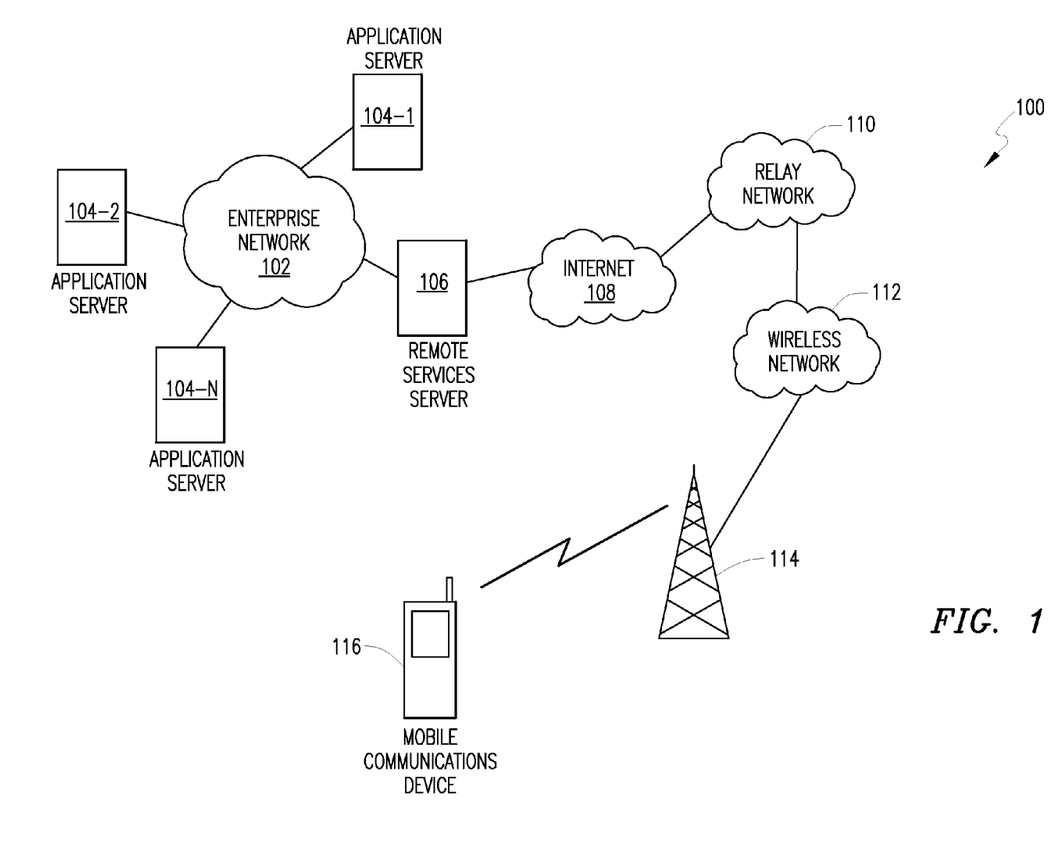
FIG. 1 depicts an exemplary network environment including a wireless packet data service network wherein an embodiment of the present patent disclosure may be practiced.

Referring now to the drawings, and more particularly to FIG. 1, depicted therein is an exemplary network environment 100 including a wireless packet data service network 112 wherein an embodiment of the present patent disclosure may be practiced. An enterprise network 102, which may be a packet-switched network, can include one or more geographic sites and be organized as a local area network (LAN), wide area network (WAN) or metropolitan area network (MAN), et cetera, for serving a plurality of corporate users. A number of application servers 104-1 through 104-N disposed as part of the enterprise network 102 are operable to provide or effectuate a host of internal and external services such as email, video mail, Internet access, corporate data access, messaging, calendaring and scheduling, information management, and the like. Accordingly, a diverse array of personal information appliances such as desktop computers, laptop computers, palmtop computers, et cetera, although not specifically shown in FIG. 1, may be operably networked to one or more of the application servers 104-$i$, $i=1, 2, \ldots, N$, with respect to the services supported in the enterprise network 102.

Additionally, a remote services server 106 may be interfaced with the enterprise network 102 for enabling a corporate user to access or effectuate any of the services from a remote location using a suitable mobile communications device (MCD) 116. A secure communication link with end-to-end encryption may be established that is mediated through an external IP network, i.e., a public packet-switched network such as the Internet 108, as well as the wireless packet data service network 112 operable with MCD 116 via suitable wireless network infrastructure that includes a base station (BS) 114. In one embodiment, a trusted relay network 110 may be disposed between the Internet 108 and the infrastructure of wireless packet data service network 112. By way of example, MCD 116 may be a data-enabled handheld device capable of receiving and sending messages, web browsing, interfacing with corporate application servers, et cetera.

For purposes of the present patent disclosure, the wireless packet data service network 112 may be implemented in any known or heretofore unknown mobile communications technologies and network protocols, as long as a packet-switched data service is available therein for transmitting packetized information. For instance, the wireless packet data service network 112 may be comprised of a General Packet Radio Service (GPRS) network that provides a packet radio access for mobile devices using the cellular infrastructure of a Global System for Mobile Communications (GSM)-based carrier network. In other implementations, the wireless packet data service network 112 may comprise an Enhanced Data Rates for GSM Evolution (EDGE) network, an Integrated Digital Enhanced Network (IDEN), a Code Division Multiple Access (CDMA) network, a Time Division Multiple Access (TDMA) network or any 3rd Generation (3G) network.

Figure 2:
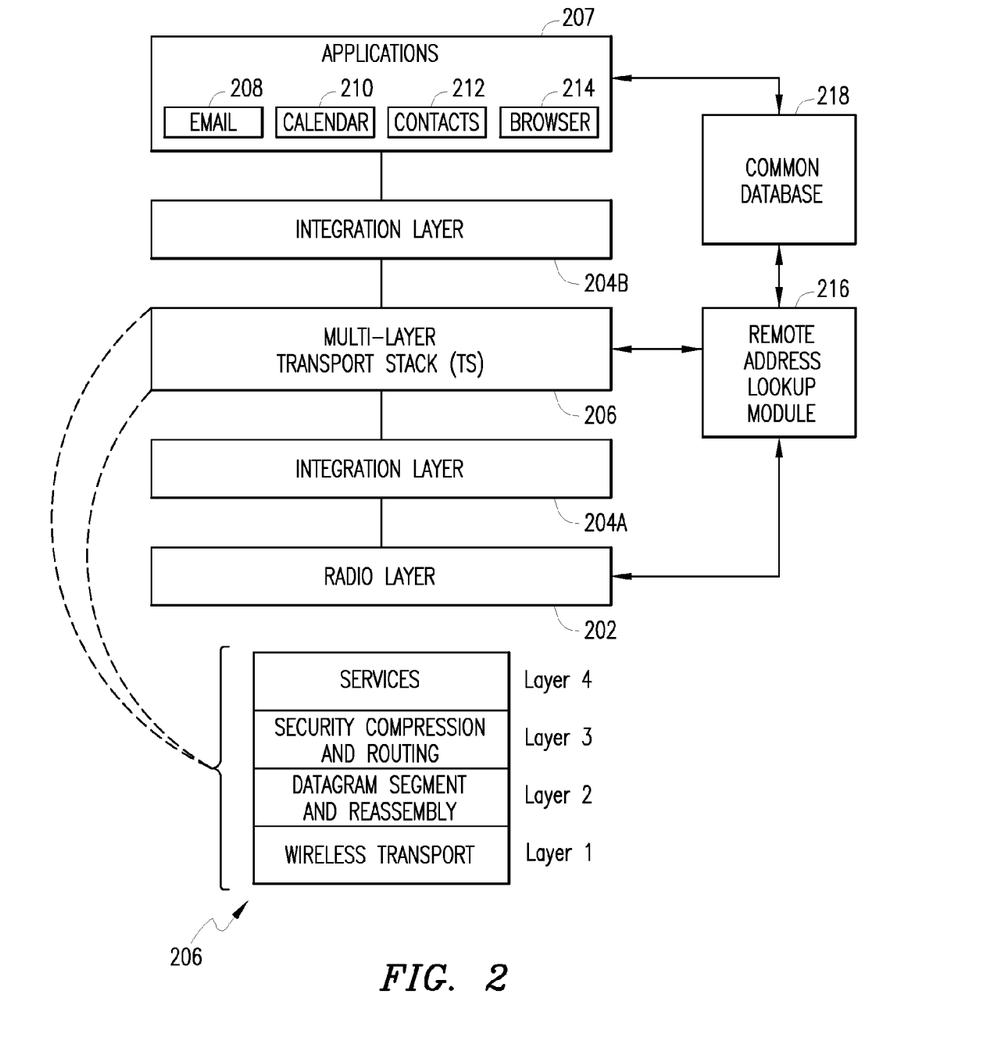
FIG. 2 depicts a software architectural view of a mobile communications device operable to share data between applications according to one embodiment.

FIG. 2 depicts a software architectural view of a mobile communications device operable to share address and other data according to one embodiment. A multi-layer transport stack (TS) 206 is operable to provide a generic data transport protocol for any type of corporate data, including email, via a reliable, secure and seamless continuous connection to a wireless packet data service network. As illustrated in the embodiment of FIG. 2, an integration layer 204A is operable as an interface between the MCD's radio layer 202 and the transport stack 206. Likewise, another integration layer 204B is provided for interfacing between the transport stack 206 and the user applications 207 supported on the MCD, e.g., email 208, calendar/scheduler 210, contact management 212 and browser 214. Although not specifically shown, the transport stack 206 may also be interfaced with the MCD's operating system. In another implementation, the transport stack 206 may be provided as part of a data communications client module operable as a host-independent virtual machine on a mobile device.

The bottom layer (Layer 1) of the transport stack 206 is operable as an interface to the wireless network's packet layer. Layer 1 handles basic service coordination within the exemplary network environment 100 shown in FIG. 1. For example, when an MCD roams from one carrier network to another, Layer 1 verifies that the packets are relayed to the appropriate wireless network and that any packets that are pending from the previous network are rerouted to the current network. The top layer (Layer 4) exposes various application interfaces to the services supported on the MCD. The remaining two layers, Layer 2 and Layer 3, are responsible for datagram segmentation/reassembly and security, compression and routing, respectively. A remote database querying application, provided as part of the software environment, is disposed in operable communication with the transport stack 206 as well as the MCD's radio layer 202. This component is represented in FIG. 2 by remote address lookup module 216. As will be described below, any data obtained via the remote database querying application may be provided in a common database 218 such that other applications may also access the data.

Figure 3:
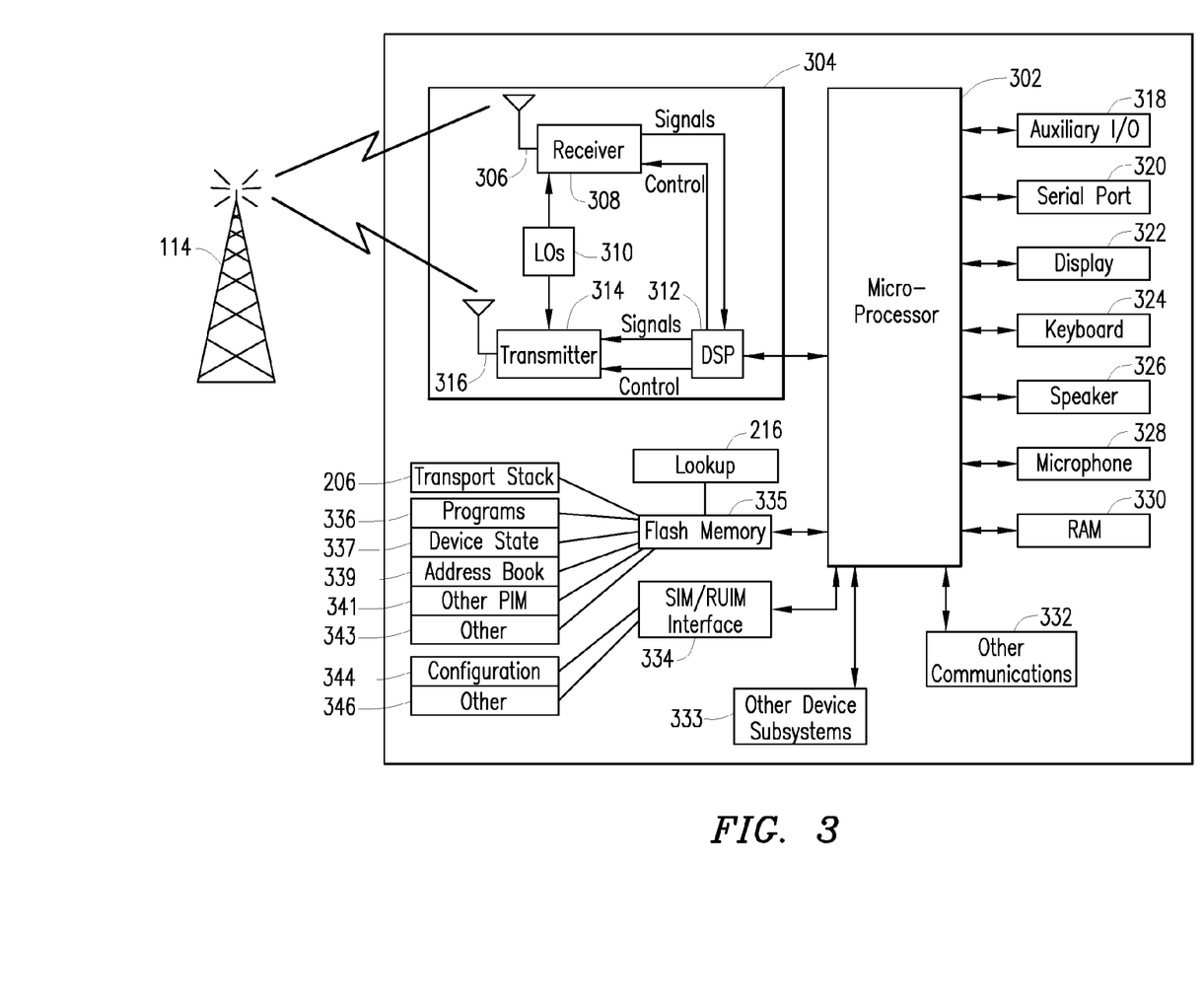
FIG. 3 depicts a block diagram of a mobile communications device operable to share data among applications according to one embodiment.

FIG. 3 depicts a block diagram of a mobile communications device operable to share data among applications according to one embodiment. It will be recognized by those skilled in the art upon reference hereto that although an embodiment of MCD 116 may comprise an arrangement similar to one shown in FIG. 3, there can be a number of variations and modifications, in hardware, software or firmware, with respect to the various modules depicted. Accordingly, the arrangement of FIG. 3 should be taken as illustrative rather than limiting with respect to the embodiments of the present patent disclosure. A microprocessor 302 providing for the overall control of an embodiment of MCD 116 is operably coupled to a communication subsystem 304 which includes a receiver 308 and transmitter 314 as well as associated components such as one or more local oscillator (LO) modules 310 and a processing module such as a digital signal processor (DSP) 312.

As will be apparent to those skilled in the field of communications, the particular design of the communication module 304 may be dependent upon the communications network with which the mobile device is intended to operate. In one embodiment, the communication module 304 is operable with both voice and data communications. Regardless of the particular design, however, signals received by antenna 306 through BS 114 are provided to receiver 308, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 312, and provided to transmitter 314 for digital-to-analog (D/A) conversion, frequency up conversion, filtering, amplification and transmission over the air-radio interface via antenna 316.

Microprocessor 302 also interfaces with further device subsystems such as auxiliary input/output (I/O) 318, serial port 320, display 322, keyboard 324, speaker 326, microphone 328, random access memory (RAM) 330, a short-range communications subsystem 332, and any other device subsystems generally labeled as reference numeral 333. To control access, a Subscriber Identity Module (SIM) or Removable User Identity Module (RUIM) interface 334 is also provided in communication with the microprocessor 302.

In one implementation, SIM/RUIM interface 334 is operable with a SIM/RUIM card having a number of key configurations 344 and other information 346 such as identification and subscriber-related data. Operating system software and transport stack software may be embodied in a persistent storage module (i.e., non-volatile storage) such as Flash memory 335. In one implementation, Flash memory 335 may be segregated into different areas, e.g., storage area for computer programs 336 as well as data storage regions such as device state 337, address book 339, other personal information manager (PIM) data 341, and other data storage areas generally labeled as reference numeral 343. Additionally, a database querying logic module, specifically remote address lookup (RAL) module 216, is shown. Those of skill in the art will appreciate that remote address lookup module 216 may be disposed within Flash memory 335 or outside of it, depending on the specific application. Furthermore, a common database for sharing data that is accessible to a number of applications may be interfaced with the RAL module 216 as well as other databases already described.

Figure 4:
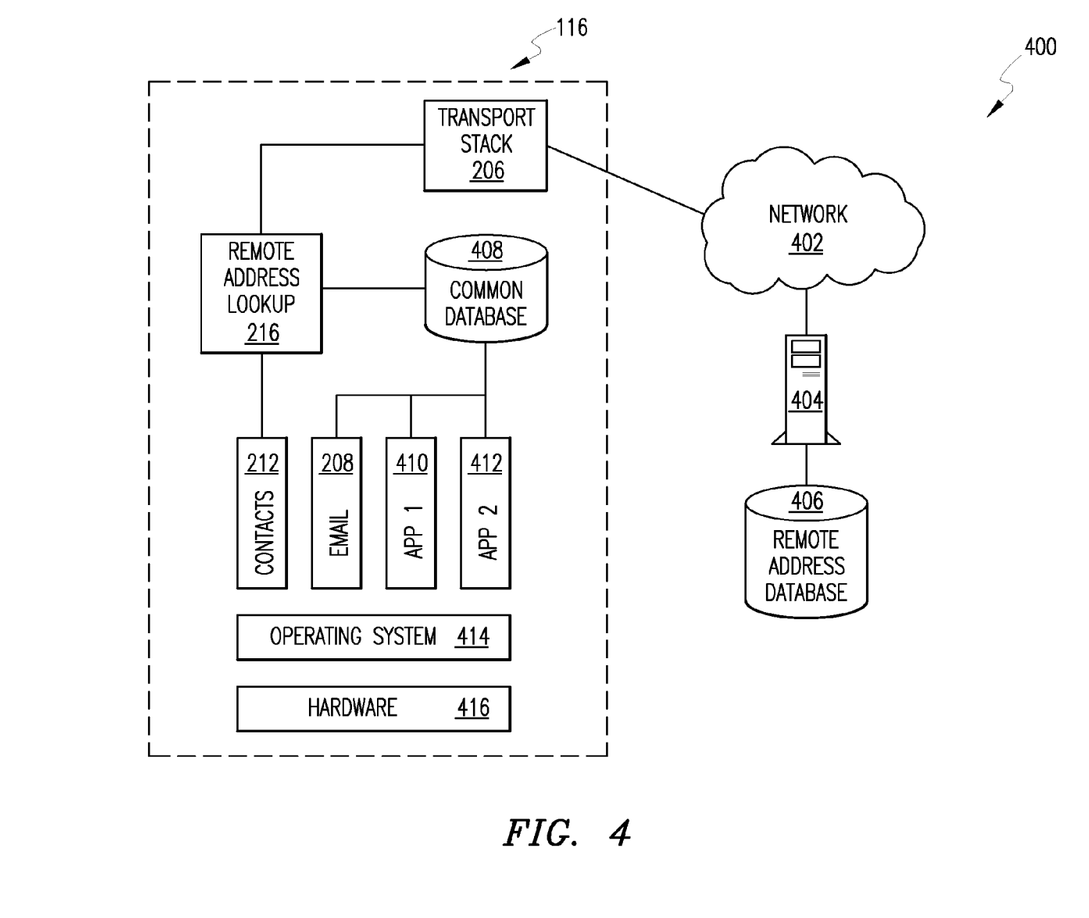
FIG. 4 depicts a block diagram of a mobile communications system architecture according to one embodiment of the present disclosure.

FIG. 4 depicts a block diagram of a mobile communications system 400 according to one embodiment of the present disclosure. System 400 includes MCD 116 operably connected to a network 402. In certain embodiments, network 402 exemplifies the entirety of the network architecture represented by elements 102-114 shown in FIG. 1. In alternate embodiments, network 402 may incorporate additional network architecture, or may consist of a simpler network arrangement. Without respect to the particular architecture involved, network 402 provides operable connection to remote server 404, which operates to manage and distribute the data stored in remote address database 406.

The content of remote address database 406 will vary by application. In certain embodiments, remote address database 406 may act as an enterprise address book, containing all of the address information for an entire company. In other embodiments, remote address database 406 may incorporate a public telephone directory for a geographic region. Certain embodiments may combine these sets of data with one another, or with additional databases, as various applications may require.

As described above, MCD 116 communicates with network 402 through transport stack 206. Transport stack 206 facilitates incoming and outgoing communication for a variety of functions, but is shown in FIG. 4 as being operably connected only to remote address lookup module 216 for clarity. In the embodiment shown in FIG. 4, the remote address lookup module 216 principally interacts with contacts application 212. In other embodiments, multiple applications may directly interact with remote address lookup module 216. As an example, contacts application 212 and email application 208 may both interact with remote address lookup module 216 as necessary.

Remote address lookup module 216 interacts with the MCD local common database 408, which holds the local address book for MCD 216. Although represented by a single element, those of skill in the art will appreciate that MCD local common database 408 may, in a particular application, be composed of multiple databases without being considered to depart from the scope of the teachings of the present disclosure. The local address book may comprise a separate segment of the local common database 408 in certain embodiments. In alternate embodiments, the data comprising the local address book may be dispersed through the MCD local common database 408.

In the embodiment shown in FIG. 4, other applications running under the MCD operating system 414 installed on the MCD hardware 416, including email application 208, share access to local common database 408, and therefore have access to the local address book. Other applications which may share access to the MCD local common database 408 are represented by elements 410 and 412. Applications 410 and 412 may be any applications making use of the data in common database 408, including but not limited to the data stored in the local address book.

Figure 5:
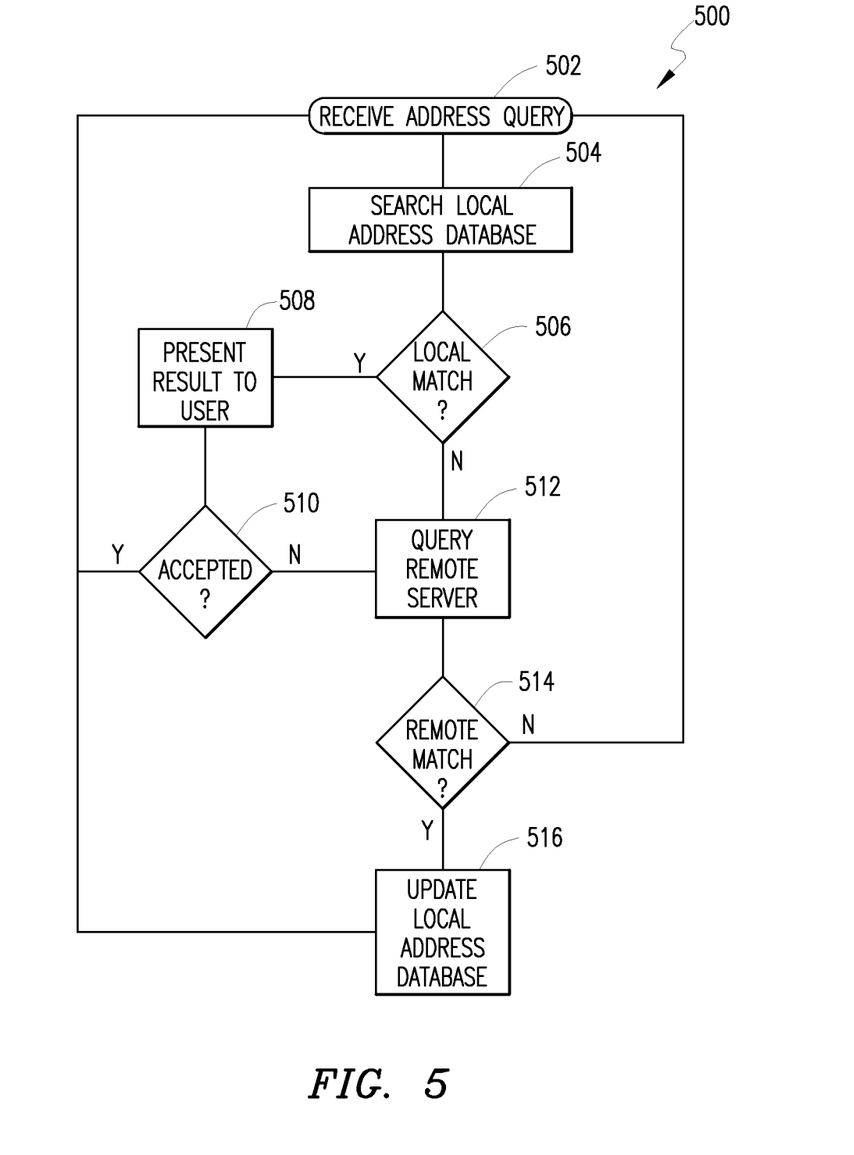
FIG. 5 depicts a flow diagram according to a method of the present disclosure.

FIG. 5 depicts a flowchart 500 showing the manner of operation of a mobile communications device architecture according to one embodiment. Process flow begins in block 502, at which point the remote address lookup module 216 first receives an address query from a source. The source may, for example, be an application running on the MCD 116, or may be direct input from the user. In certain embodiments, the source may even be an application running in an environment outside the MCD 116.

Upon receipt of an address query from a source, the remote address lookup module 216 queries the local address database within the local common database 408, in an attempt to find a match between the query received from the source and a record in the local common database 408, as shown in block 504. If at least one potential match to the query is found within the local common database 408 (decision block 506,) process flow proceeds to block 508 where the remote address lookup module 216 presents at least one of the potential matches to the user or other query source for review or comparison. Generally, if more than one matching record is identified, each of the records will be presented to the user or other query source for review until one of the matching records is selected or there are no more matching records.

If at least one result obtained from the search of the local common database 408 is acceptable to the query source (decision block 510), the querying and search process is complete, and process flow returns to block 502, wherein the remote address lookup module 216 awaits additional address queries. If the result obtained from the search of the local common database 408 is not acceptable to the query source (decision block 510), the querying and search process is not complete, and process flow continues to block 512, wherein the remote address lookup module 216 queries at least one remote address database 406 through at least one remote server 404, as described in block 512.

In certain embodiments, the remote server 404 and remote address database 406 may be an enterprise-level server and database. In alternate embodiments, the remote server 404 and remote address database 406 may comprise a publicly-accessible address directory. Remote server 404 and remote address database 406 shown in FIG. 4 may, of course, merely represent a complex network incorporating a series of server and database combinations. For example, the process of remote address lookup may search a department-level address database first, followed by a division-level address database and then a corporate-level address database if the more localized searches are unsuccessful. In the event that the address information is not found within any address database internal to the enterprise, the remote address lookup could incorporate a search of a publicly available database as a last resort. Any and all of these arrangements are within the spirit and scope of the present disclosure.

If the query of the remote address database 406 is unsuccessful in finding a match to the query (decision block 514), process flow returns to bubble 502, wherein the remote address lookup module 216 awaits additional address queries. If the query of the remote address database 406 is successful in finding a match to the query (decision block 514), process flow continues to block 516, wherein the remote address lookup module 216 updates the local address database operably interfaced with the local common database 408 to incorporate the newly-acquired address data found in the remote address database 406. In certain embodiments, storage of the remote address data within the local common database 408 may be automatic. In other embodiments, the address data acquired from the remote address lookup may only be stored in the local address database under the direction of, or with the assent of, the user or other query source.

As described above, data stored in the common database 408 is available not only to contacts application 212 and email application 208, but other applications as well. In the embodiment shown in FIG. 4, applications 410 and 412 have access to common database 408, which may incorporate the local address database in one implementation. The effect of this particular architecture is that the local address database can be shared by the applications resident on MCD 116, and the benefit of an update to the content of the local address database made by, for example, remote address lookup module 216 are available to each of these applications. In certain embodiments, applications 410 and 412 may have the capability to make changes to the local address database within local common database 408. In other embodiments, changes to the local address database may be the shared province of the contacts application 212 and the remote address lookup module 216, and the access granted to other applications may be exclusively read-only. In other words, the various applications on the mobile communications device may be given different access/update privileges with respect to the local common database 408. Any of these arrangements is within the scope of the present disclosure.

Figure 6:
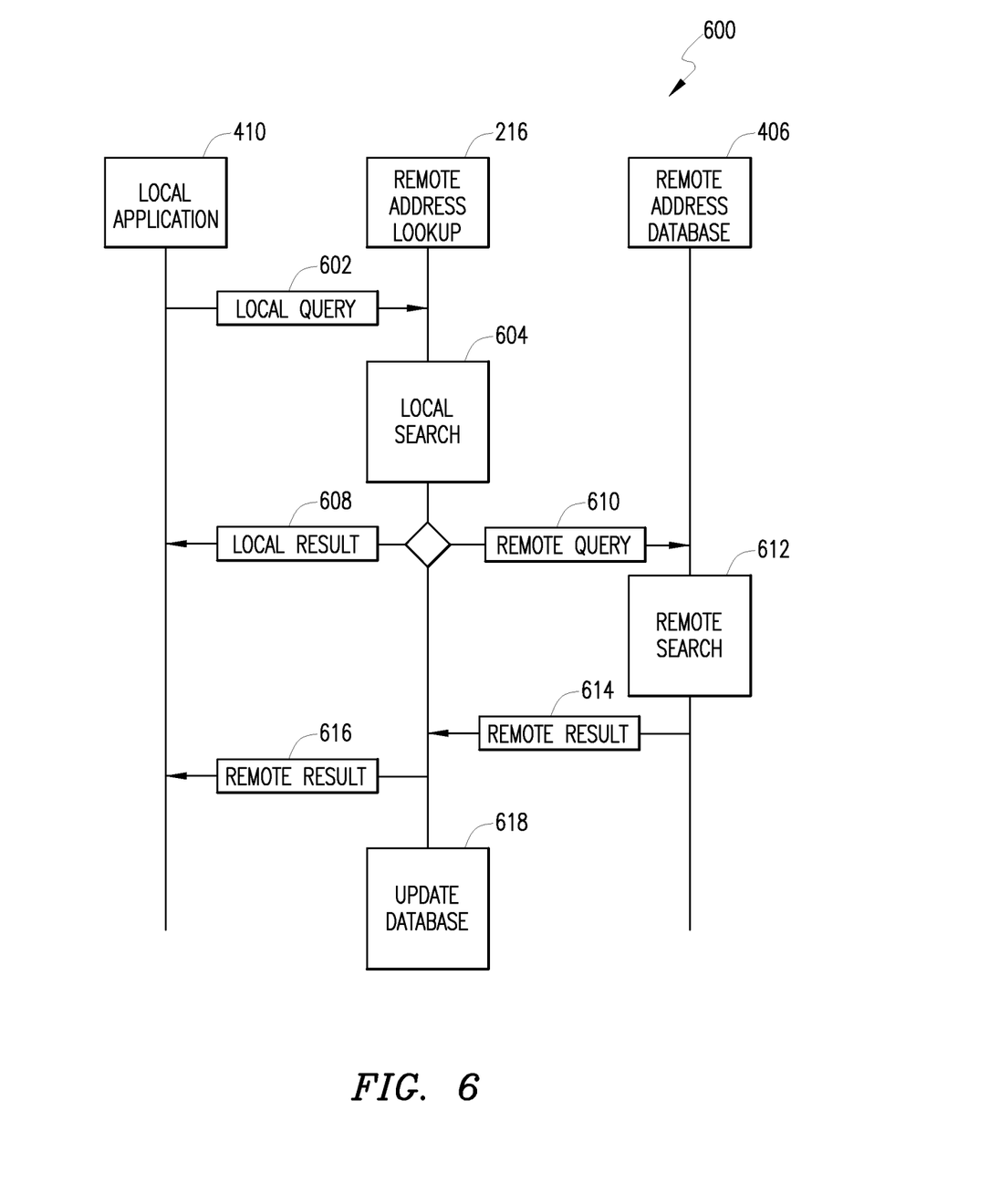
FIG. 6 depicts a message flow diagram according to an embodiment of the present disclosure.

FIG. 6 depicts a message flow diagram 600 according to an embodiment of the present disclosure. It will be apparent to one of skill in the art that the process depicted in message flow diagram 600 is the process depicted in FIG. 5 as viewed from a different perspective. Message flow diagram 600 depicts the flow of information between a local application 410, remote address lookup module 216 and remote address database 406, as effectuated via a plurality of messages therebetween.

Upon receipt of a local query 602, remote address lookup module 216 performs a local search 604 of the common database 408. In the event that remote address lookup module 216 identifies at least one result matching local query 602 within the common database 408 and at least one matching result is acceptable to the local application 410, the remote address lookup module 216 communicates the results of the local search 604 to the local application 410, and the process is complete. Those of skill in the art will note that the communications between the local application 410 and the remote address lookup module 216 verifying acceptability of the local result 608 to the local application 410 are omitted from FIG. 6 for clarity.

In the event that the remote address lookup module 216 fails to identify any result matching local query 602 within the local common database 408, or succeeds in identifying a result which is not acceptable to local application 410, remote address lookup module 216 will then proceed to query outside the MCD 116 for the requested information. The remote address lookup module 216 will communicate a remote query 610 to at least one remote address database 406. Remote query 610 will generally be made across network 402 and be handled by remote server 404, which will conduct a remote search 612 of remote address database 406.

In the event that a record matching the remote query 610 is identified within remote address database 406, a remote result 614 will be communicated to remote address lookup module 216. The content of remote result 614 will then be forwarded on to local application 410 as remote result 616. Additionally, remote address lookup module 216 will perform an update 618 to the local common database 408, the contents of which are shared among the local applications resident on MCD 116, as described above. Although it is not shown in FIG. 6, failure to identify a matching record within remote address database 406 could result in a subsequent query of one or more additional remote address databases, as discussed above in connection with FIG. 5.

For purposes of illustration of the above, it will be assumed that a user of MCD 116 wishes to retrieve the contact information for a person by the name of 'John White', which contact information does not exist in the local address database within the MCD 116, but does exist in remote address database 408. Upon receiving the query 'JOHN' from the user via a local application 410, the remote address lookup module 216 would first conduct a search of the local address database. In the event that the local address database incorporates address information for John Smith, the remote address lookup module 216 may identify a potential match, retrieve that information and present it to the user. Under the conditions presented above, the user is seeking John WHITE, and not John SMITH. Accordingly, the user would not accept the identified record, which will force the remote address lookup module 216 to conduct a remote query of the remote address database 406.

Upon successful completion, under the circumstances as presented, the query of the remote address database 406 will return at least one remote result, which will be relayed to local application 410 by the remote address lookup module 216. Because at least one of the remote results will be the desired address data for John White, the remote address lookup module 216 will store this address data in the local common database 408. Accordingly, the next time that address data for John White is required by application 410, or any of the other applications sharing local common database 408, the address data will be found in local common database 408, and a query of a remote database will not be necessary.

It is believed that the operation and construction of the embodiments of the present patent disclosure will be apparent from the Detailed Description set forth above. While the exemplary embodiments shown and described may have been characterized as being preferred, it should be readily understood that various changes and modifications could be made therein without departing from the scope of the present invention as set forth in the following claims. As an example, although the disclosure has been focused on the use of the remote lookup and local common database in the context of address data, there is nothing within the spirit and scope of the present disclosure limiting the above methods, systems and apparatus to address data specifically, and the same can be used in any application in which a subset of a larger, centrally-located database may be needed locally.

What is claimed is:

1. A non-transitory computer-readable medium having a sequence of program instructions which, when executed by a processor, perform a method for sharing address data among multiple applications on a mobile communications device, the method comprising:
   receiving a query from a first source at an address lookup module on the mobile communications device;
   determining that no record in a local common database disposed on the mobile communications device meets the conditions of the received query;
   receiving, responsive to querying a remote address database disposed on a remote server, at least one remote matching record meeting conditions of the received query;
   responsive to the address lookup module determining that at least one remote matching record is acceptable to the first source, updating the local common database to incorporate the at least one remote matching record; and
   providing the at least one remote matching record from the local common database to a second source that is different from the first source.

2. The non-transitory computer-readable medium of claim 1, wherein the query is from a messaging application.

3. The non-transitory computer-readable medium of claim 2, the method further comprising accessing the local common database to use the incorporated remote matching record from an application operating on the mobile communications device.

4. The non-transitory computer-readable medium of claim 3, wherein the first source is an address book application operating on the mobile communications device.

5. The non-transitory computer-readable medium of claim 1, wherein the remote address database comprises an enterprise address book.

6. The non-transitory computer-readable medium of claim 1, wherein the remote address database comprises a public telephone directory.

7. The non-transitory computer-readable medium of claim 1, wherein the network is a General Packet Radio Service (GPRS) network, an Enhanced Data Rates for Global System for Mobile Communications (GSM) Evolution (EDGE) network, a 3rd Generation (3G) network, an Integrated Digital Enhanced Network (IDEN), or a Code Division Multiple Access (CDMA) network.

8. The non-transitory computer-readable medium of claim 1, wherein both the first source and the second source are on the mobile device.

9. The non-transitory computer-readable medium of claim 1, wherein one of the first source and the second source is on the mobile communications device and the remaining one is not on the mobile communications device.

10. The non-transitory computer-readable medium of claim 1, wherein the sequence of program instructions is part of an operating system.

11. The non-transitory computer-readable medium of claim 1, wherein the sequence of program instructions is part of a virtual operating system.

12. A mobile communications device comprising:
   a communication subsystem for communicating with a network;
   a processor operably connected to the communication subsystem and to a memory, the memory containing a local common address database and instructions that when executed by the processor perform a method comprising:
   receiving a query from a first source at an address lookup module on the mobile communications device;
   determining that no record in a local common database disposed on the mobile communications device meets the conditions of the received query;
   receiving, responsive to querying a remote address database disposed on a remote server, at least one remote matching record meeting conditions of the received query;
   responsive to the address lookup module determining that at least one remote matching record is acceptable to the first source, updating the local common database to incorporate the at least one remote matching record; and
   providing the at least one remote matching record from the local common database to a second source that is different from the first source.

13. The mobile communications device of claim 12 wherein the instructions are part of an operating system.

14. The mobile communications device of claim 12 wherein the instructions are part of a virtual operating system.

15. The mobile communications device of claim 12 wherein the local common address database object is accessible to a contacts application, a browser application, and a messaging application.

16. The mobile communications device of claim 12 wherein the remote address database comprises one of an enterprise address book and a public telephone directory.

* * * * *